INVENTOR.
WERNER A. GIESEKE
BY Benedict & Swartwood
ATTORNEYS.

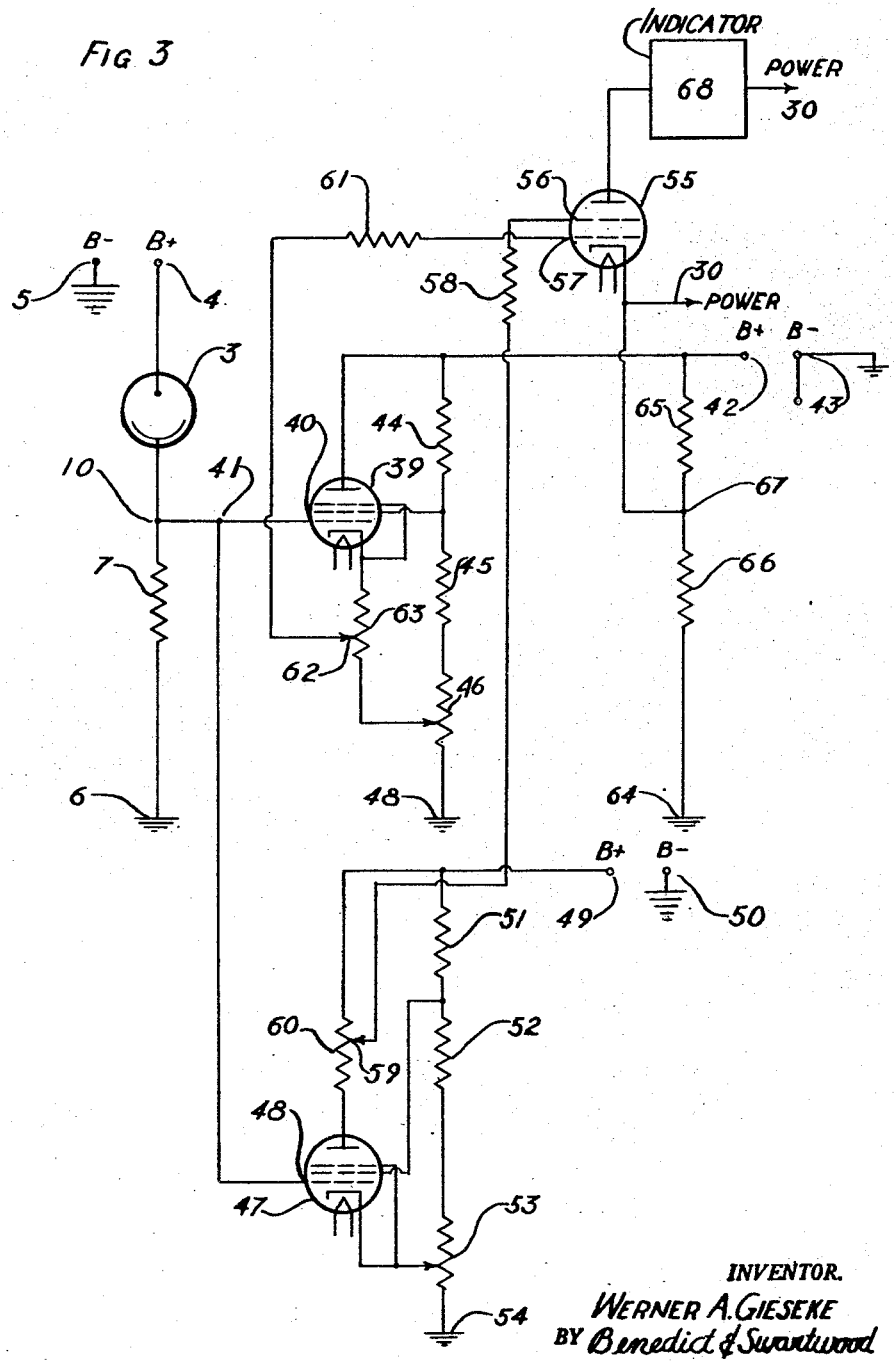

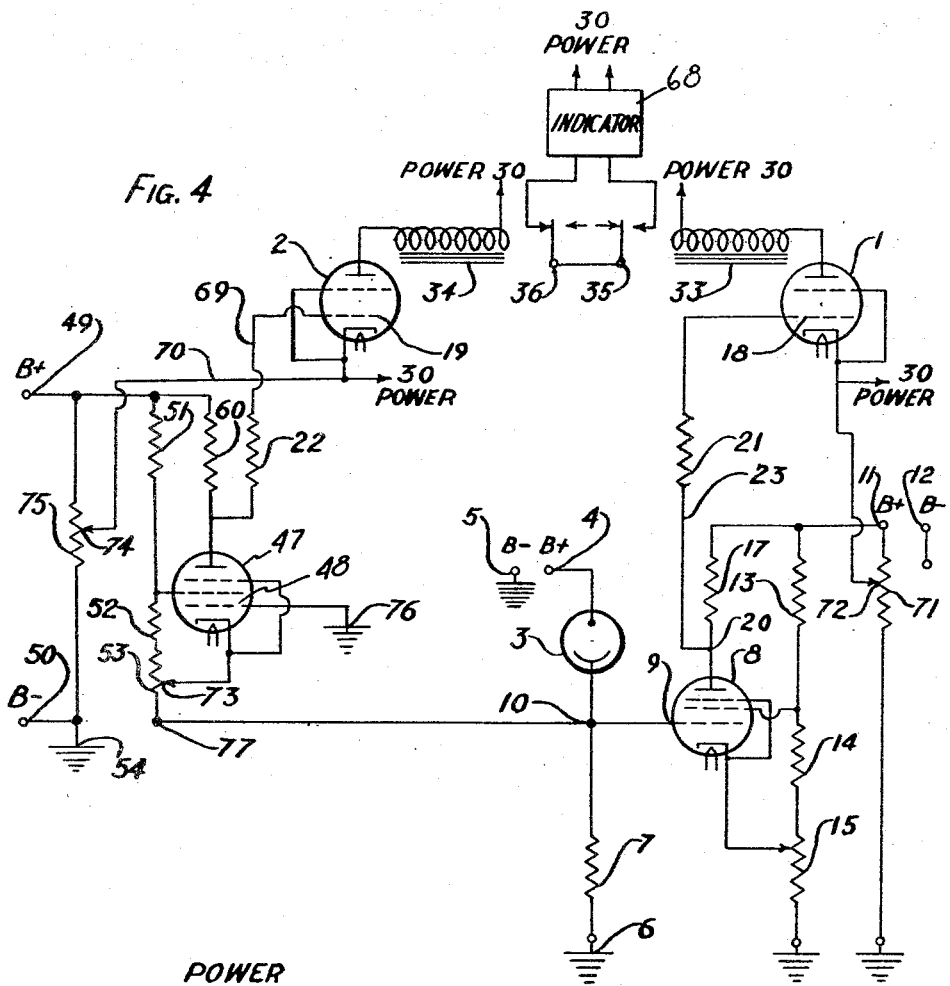
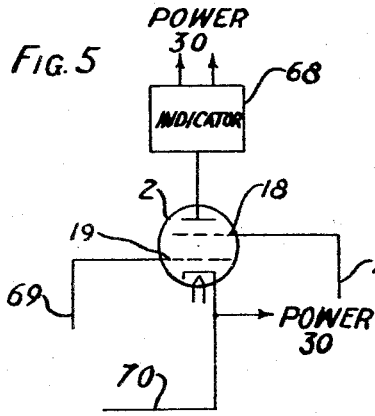

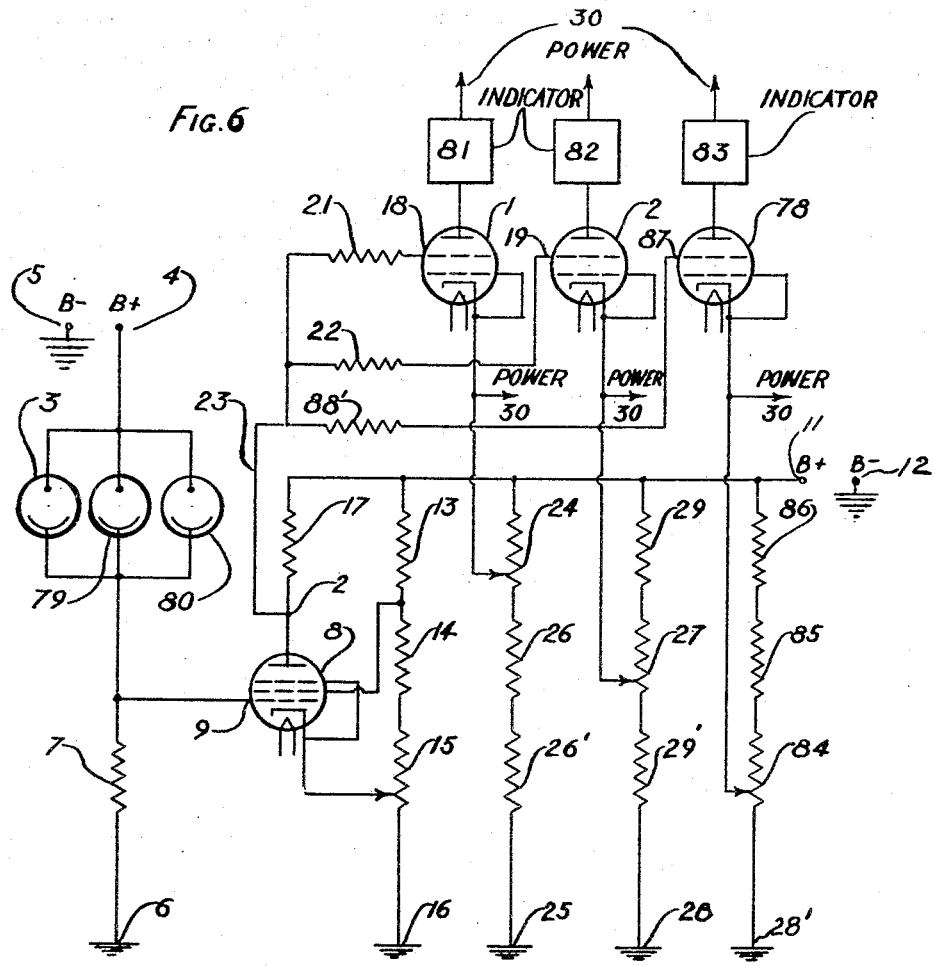

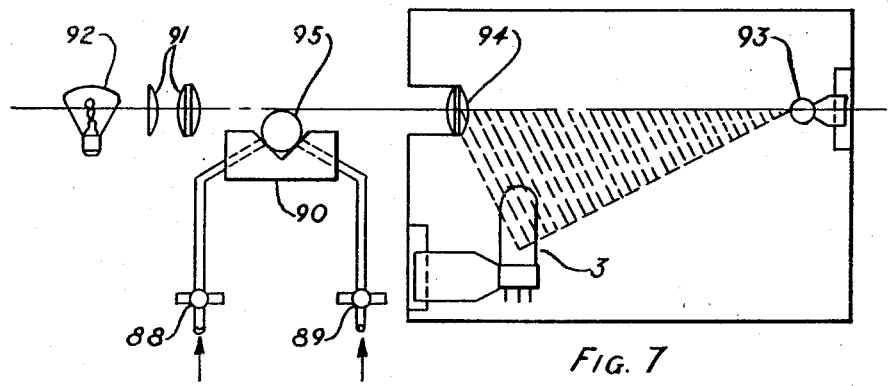
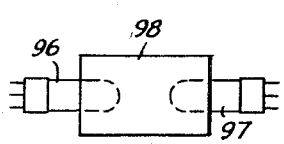
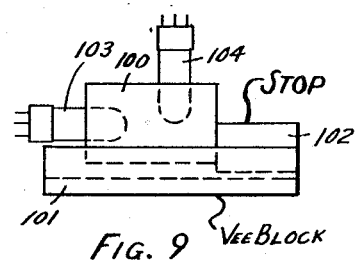
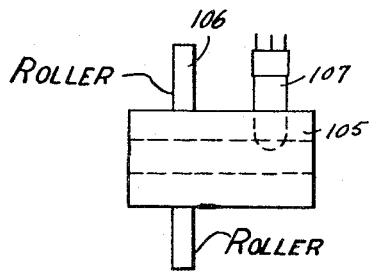
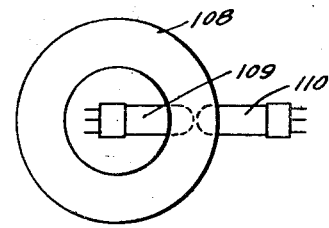
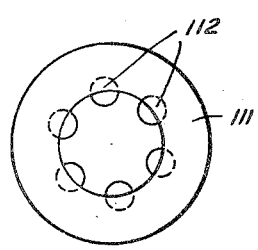

Patented Dec. 30, 1947

2,433,559

UNITED STATES PATENT OFFICE 2,433,559

PHOTOELECTRIC ARTICLE GAGING APPARATUS

Werner A. Gieseke, Danville, Ill., assignor to Samuel C. Hurley, Jr., Danville, Ill.

Application July 26, 1944, Serial No. 546,702

4 Claims. (Cl. 177—311)

This invention relates to an improved photoelectric inspection and electronic device adapted to inspection, identifying, measuring, controlling, and other types of operations where it is useful in connection with existing machines.

It is particularly directed to measuring, determining, or inspecting external or internal dimensions and surfaces of objects. In other words, my invention is particularly useful in connection with determining the silhouette of an article. Among the objects of my invention are to provide a novel method for control of the circuit for use in connection with:

1. The examination, inspection, and measurement of objects.
2. Checking the outline or scanning the outside and internal surfaces of articles.
3. For measuring and indicating the outside and inside diameters of tubes, cylinders, hollow truncated cones, hollow truncated cylinders, cores through spheres, and the like.
4. For checking annular objects for concentricity and eccentricity.
5. For inspection of cross-sectional shapes of articles.
6. For determining and indicating shapes such as threads, screws, bevels, anchors, curvatures, rounds, etc.

My electronic circuit can be used in connection with machines for sorting objects of various sizes or shapes.

My circuit may be used in connection with the measurement and control of thickness and other dimensions of paper, films, box board, card board, linoleum or sheet metal.

In general, my invention comprises an electronic circuit comprising at least one amplifying tube responsive to the amount of light received by a light sensitive circuit, at least one control or power tube and at least two control grids and means for independently and successively controlling the bias on said control grid, depending upon the amount of light received by the light sensitive circuit.

The bias of the control grids is not controlled so much by the intensity of the light received by the light sensitive circuit as by the total amount of light received by the light sensitive circuit. In one of my preferred forms, the intensity of the light falling upon a phototube or other suitable light sensitive device in a light sensitive circuit is maintained substantially constant; but the amount of light received by the phototube is varied by varying the portion of the phototube which receives light. This is usually accomplished by varying the portion of the phototube being placed in shadow by the image of the article being inspected.

In one specific embodiment of the broad aspect of my invention just described for measuring the dimension of an article within a predetermined tolerance range, I provide a light sensitive circuit comprising at least one phototube. If more phototubes are employed in the circuit, they should be connected in parallel since the electronic device is only responsive to the amount of light received by the light sensitive circuit. The light sensitive circuit is connected to an amplifying tube preferably of the vacuum type and especially the pentode type. The plate current caused by the amplifying tube is controlled by the amount of light received by the light sensitive circuit. The control grids of a pair of electronic power or control tubes are connected to the plate circuit of the amplifier in between the anode of the amplifier and a loading resistor such that the more current flowing through the amplifier, the more the bias of the control grids is driven in a negative direction. The cathode of each of the control or power tubes is adjustably connected to a source of potential and the firing for each of the power tubes relative to the amount of current flowing through the amplifying tube is controlled by individually and separately adjusting the potential placed on the respective cathode circuits of the power tube.

Normally, when the light sensitive device receives a normal amount of light, neither of the power tubes are firing or conducting since the current flowing through the loaded plate circuit of the amplifying tube is such that the bias on each of the power tubes is maintained highly negative. As the amount of light received by the light sensitive device decreases, the current flowing through the plate circuit of the amplifying tube decreases and the bias on one of the power or control tubes reaches such a point that it is either neutral or positive and that tube will fire. As the light on the light sensitive circuit is further reduced, in like manner the second power tube will fire.

By this independent adjustment of the potential to which the cathode circuits of the power tubes are connected and the cooperative arrangement of adjustments and the amount of light received by the light sensitive circuit, I am able to vary the tolerance range within which an article will be tested for a given specification.

For example, in measuring the diameter of a round within a given tolerance range, the piece will only be good if it falls within the limits of the tolerance range or within the period that both of the power tubes conduct. By providing suitable relays and switches and indicating devices, I am able to indicate when a piece comes within the required tolerance range and when it falls outside the tolerance range and I am able to vary the tolerance by varying the point at which each of the power tubes conducts.

Throughout the description, I have referred to causing or driving the potential or bias of the control grid in a positive direction so that the tube will ionize, fire, or conduct. Depending on the operation characteristics of the tube, the tubes will conduct when the bias on the control grid is slightly negative, say, a negative potential within about five volts. I therefore mean by a positive bias at least sufficient low negative bias for the tube to conduct although the bias may be positive or slightly negative within the operating characteristics of the tube.

I have also referred to firing of a tube which means either causing a tube to conduct or ionize but the term is applicable to either vacuum tubes or tubes of the gas-filled, arc discharge type since both types may be used in my invention.

Other embodiments of my invention will become apparent by referring to the drawings in which Fig. 1 illustrates a device for independently controlling the successive firing of two power tubes.

Fig. 3 is a modification of my invention illustrating the use of only one power tube and two amplifying tubes connected to only one light sensitive device.

Fig. 4 illustrates the principle of my invention using two power tubes and two amplifiers, all controlled by one light sensitive circuit with one of the amplifiers having its control grid connected to the ground or what is known as the cut-off position.

Fig. 5 is similar to Fig. 4, showing the use of only one power tube having two control grids.

Fig. 6 illustrates an electronic circuit particularly suitable for indicating the size of various sized articles.

Fig. 7 illustrates an optical system which may be used in connection with any of the Figs. 1 to 6, and also shows a specific method for accepting or rejecting an article, depending on whether or not the article meets the required specifications.

Figs. 8 to 12, inclusive, illustrate diagrammatically some of the types of inspections that may be made by my device.

Figure 1:
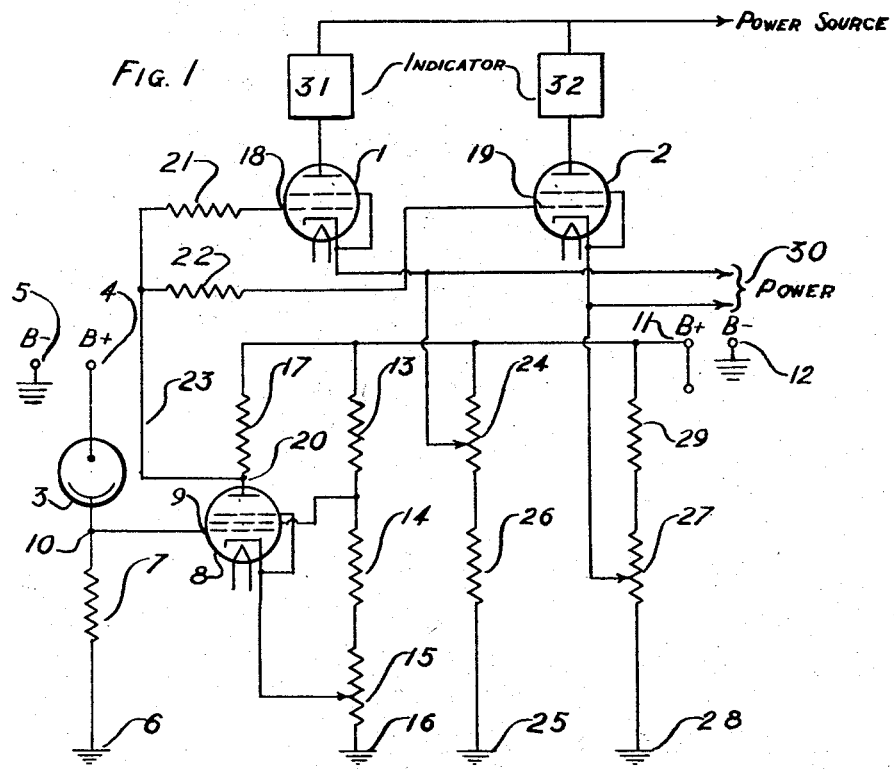

Referring to Fig. 1, a light sensitive device 3, shown as a phototube, is connected to a source of positive potential at point 4 and negative potential at point 5. The cathode of the phototube is connected to the ground 6 through the resistor 7. An amplifying tube 8 preferably of the pentode type, although other suitable types may be used, has its control grid 9 connected to point 10 between the phototube 3 and the resistor 7 in the light sensitive circuit. The operating voltages and current for the amplifying tube 8 are provided by connecting it to a source of potential having its positive terminal at 11 and its negative terminal at 12 through the dividing resistors 13, 14, and 15, with ground potential supplied at point 16. The plate circuit of the amplifying tube 8 is connected to the positive terminal 11 through the loading resistor 17. When no or very little light is received by the phototube 3, the potential on the control grid 9 is substantially that of ground and the cathode of tube 8 is adjustably connected to resistor 15 at a potential substantially above ground such that the amplifying tube 8 conducts little or no current.

As tube 3 receives more light, it places a greater positive potential on the control grid of tube 8 causing a greater amount of current to flow through the plate circuit containing resistor 17. Thus, by connecting the control grids 18 and 19, respectively, of tubes 1 and 2 to point 20 in between the plate of tube 8 and the loading resistor 17, the control grids 18 and 19 have their bias driven in a negative direction when more current flows through the plate circuit of tube 8. If sufficient current flows through the anode or plate circuit of tube 8, tubes 1 and 2 will be unable to conduct. The control grids 18 and 19 are respectively connected through limiting resistors 21 and 22 to the line 23 connected to the point 20 in the plate circuit of tube 8. The purpose of limiting resistors is to limit the amount of potential that can be placed upon the control grids 18 and 19.

The control tubes 1 and 2 are preferably of the gas-filled arc discharge type, although other types may be used within the scope of my invention. The cathode and the shield grids of these tubes are connected together as shown. The cathode of tube 1 is connected to an adjustable resistor 24. The adjustable resistor 24 is connected to a relatively high positive potential by being connected to positive terminal 11. The adjustable resistor 24 is connected to a ground 25 through the dividing resistor 26. The power tube 2 has its cathode circuit connected to an adjustable resistor 27 at a point which is relatively more negative than the point where the cathode of tube 1 is connected to the adjustable resistor 24. The adjustable resistor 27 is connected to terminal 11 through dividing resistor 28. The potential and current for tubes 1 and 2 are provided by connecting the cathodes of each of the tubes to a power source 30 to which is also connected the anode circuits of tubes 1 and 2 through the indicators 31 and 32. The indicators 31 and 32 may be of any conventional type such as bells, flags, meters of all kinds, etc. The indicators are only operated when tubes 1 and 2 are conducting.

To describe one operation of this circuit, I will consider it first when no light reaches the phototube 3 or, in other words, phototube 3 is placed in shadow by the piece undergoing inspection. In this case, the amplifying tube 8 is non-conducting and the power tubes 1 and 2 are conducting since there is no current flowing through the plate circuit of the amplifying tube 8. When no current is flowing through the plate circuit, the control grids 18 and 19 of the tubes 1 and 2, respectively, are connected in effect directly to the positive terminal 11, whereas the cathodes are connected to the adjustable resistors 24 and 27 at a point lower in positive potential than point 11. Therefore, the bias on each of the control grids is rendered sufficiently positive to render tubes 1 and 2 conductive. As phototube 3 receives more light, the system will reach such a point that sufficient current flows through the plate circuit of the tube 8 that a negative potential will be placed on the control grid 18 of tube 1 so as to decrease or stop the flow of current in the plate circuit of tube 1 and the power tube 1 ceases conducting. As the phototube 3 receives more light, the system will reach such a point that sufficient current will flow through the plate circuit of the amplifying tube 8 so as to drive the bias on control grid 19 of tube 2 sufficiently negative, or, in other words, drive the potential of the grid 19 below the point of potential to which the cathode of tube 2 is connected to the adjustable resistor 27 so that tube 2 will cease to conduct. Thus, when the tube 3 receives the maximum amount of light, neither of the tubes 1 and 2 is conducting. As the light is decreased, tube 2 will conduct first and as the light is further decreased, tube 1 will then conduct.

In the application of my device to inspection operations the inspection operation is conducted such that the piece is good while both of the tubes 1 and 2 are conducting provided the phototube 3 receives the proper amount of light. It can thus be seen that as the amount of light on tube 3 decreases, the conditions after firing of tubes 2 and 1 can be independently adjusted by the resistors 24 and 27. If the maximum amount of light is on the tube 3 and it is desired to have tube 2 fire with just a slight decrease in amount of light, the potential on the cathode of tube 2 is adjusted in a negative direction by means of adjustable resistor 27. Likewise, if it is desired to have tube 1 fire for a very large decrease in amount of light received by tube 3, the adjustable resistor 24 is adjusted so as to connect the cathode of tube 1 at a higher positive potential than is shown on the drawing. Thus, the amount of light required to cause tube 2 to fire and tube 1 to fire as the amount of light on tube 3 varies, may be changed by adjusting the resistors 24 and 27. This method and means for adjusting the firing conditions provides a novel method and device for controlling the tolerance in measuring a dimension of a specimen. This can be more readily explained by referring to Fig. 2. Throughout the description and illustrations, the same numbers used in the various figures will apply to the same or equivalent parts for the sake of simplicity.

Figure 2:
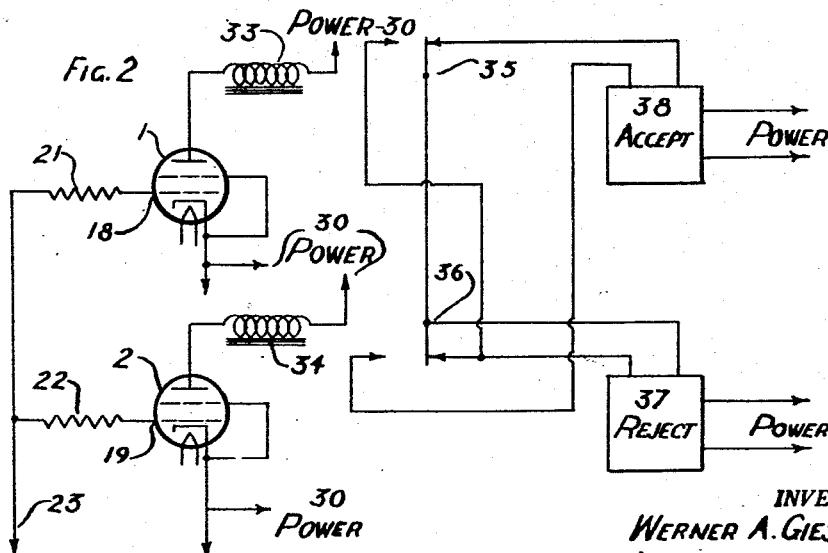
Fig. 2 shows a relay switch system which may be used in connection with the device shown in Fig. 1.

Referring to Fig. 2, the anode or plate circuits of the tubes 1 and 2 are connected respectively to relay coils 33 and 34. Relay coil 33 is positioned to actuate the relay switch 35 and relay coil 34 is positioned to actuate the relay switch 36. The position of the relay switches shown in Fig. 2 are for the maximum light received by the phototube 3 of Fig. 1. When the tube 3 receives maximum light, neither power tube 1 nor power tube 2 are fired and the relay coils 33 and 34 are not energized and the relay switches 35 and 36 are positioned such that the reject indicator or selecting means 37 has its circuit closed. In inspecting specimens for a given dimension within a predetermined tolerance range, if the dimension is proper, it will shadow tube 3 such that tube 3 will receive only sufficient light for the power tube 2 to be fired, which will actuate the relay switch 36 opening the reject circuit and closing the accept circuit. Within the tolerance range, less light may be received but the accept circuit will continue to be actuated. However, if the object is too large, it will reduce the amount of light received by tube 3 to such a point that the tube 1 will fire, opening the accept circuit and again closing the reject circuit. Thus by the individual control of the potential to which the tubes 1 and 2 are connected, the successive firing of tubes 2 and 1 gives a tolerance within which the piece may be accepted; and if the piece is too large, it will be rejected because tube 3 receives too little light and the power tube 1 fires, opening the accept circuit and closing the reject circuit and if the piece is too small, it will increase the light on phototube 3 sufficiently to fire tube 2 and the reject circuit is closed. The same circuit shown in Fig. 2, instead of accepting a piece within a definite tolerance range, could be used to indicate two different sizes of articles.

Fig. 3 shows another, although not necessarily equivalent, embodiment of my invention. An amplifying tube 39, similar to the amplifying tube 8 of Fig. 1, has its control grid 40 connected to point 41 which is also connected to the point 10 in a similar manner that the control grid 9 of tube 8 is connected to point 10 in Fig. 1. The plate of amplifying tube 39 is connected directly to the positive source of D. C. potential at terminal 42, said source having its negative terminal at point 43. Suitable dividing resistors 44 and 45 and 46 are provided to give the proper operating voltage potentials for the amplifying tube 39. When no light is on tube 3, the potential on grid 40 of tube 39 is substantially that of ground, whereas the cathode of tube 39 is maintained at a potential substantially above ground and the tube 39 conducts little or no current. In a similar manner, an amplifying tube 47 has its plate circuit connected to a source of D. C. potential having its positive terminal at 49 and its negative terminal at 50 and the operating current and plate voltages are maintained through dividing resistors 51, 52, and 53, connected to the ground at 54. Likewise, the control grid 48 is connected to point 41, and when there is substantially no light on phototube 3, its potential is substantially that of ground, whereas the cathode of tube 47 is connected to a point substantially above ground and no or very little current will flow through tube 47. A power tube 55, similar to tubes 1 and 2 of Fig. 1, contains two control grids 56 and 57. The control grid 56 is connected through limiting resistor 58 to adjustable contact point 59 on the adjustable loading resistor 60 which is connected between the terminal 49 and the anode of tube 47. The control grid 57 of tube 55 is connected through loading resistor 61 to the adjustable contact point 62 on the adjustable loading resistor 63 which is connected between the cathode of tube 39 and the adjustable resistor 46. Thus, it is apparent that when the tube 47 is rendered substantially non-conducting, the control grid 56 of tube 55 is connected to a source of positive potential higher than the cathode of tube 55, since the said cathode is connected at point 67 of relatively low negative potential between the positive terminal 42 of the direct current source of potential and the ground 64 and also between the dividing resistors 65 and 66. As the amount of light increases on tube 3, the conduction of tube 47 increases and the current flowing through the resistor 60 increases and a point will be reached due to the current flowing through the resistor 60 at which the control grid 56 of the tube 55 will be driven sufficiently negative as to prevent tube 55 from firing, even though sufficient positive potential were placed on control grid 57. The control grid 57 is maintained sufficiently negative with respect to the cathode of the tube 55 when no current is flowing through the tube 39 that this bias itself can prevent tube 55 from firing even though the positive potential on control grid is relatively high. However, as tube 3 receives more light, the current flowing through the cathode circuit of tube 39 tends to drive the bias on the control grid 57 in a positive direction which will overcome the negative potential of the cathode which is connected at point 67 such that the tube 55 will fire providing a proper potential is maintained on control grid 56. Thus, as tube 3 receives more light, it tends to drive the bias on control grid 56 in a negative direction and the bias on the control grid 57 in a positive direction and there is only a certain condition that the bias on both grids is sufficiently positive as to permit tube 55 to fire.

In a typical operation of my device, I will assume that maximum light is received by tube 3. In this case, the maximum current is flowing through tubes 39 and 47, and the bias on the control grid 57 is maintained relatively high in a positive direction, whereas the bias on grid 56 is maintained at a relative low negative potential and thus the tube 55 will not fire. As the tube 3 receives less light, it will reach a point depending upon the point of contact of the grid 56 to the adjustable resistor 60 such that the bias on the grid 56 will become sufficiently positive so that the tube 55 will fire. The tube 55 will continue to fire with further decrease in light, depending upon the point of the contact point 62 on adjustable resistor 63, until the decrease in current flowing through the amplifying tube 39 causes a sufficiently negative potential to be placed on the control grid 57 that the bias becomes negative and the tube 55 will cease firing. Thus, in passing from maximum light on tube 3, there is only one range of intensities of the light received on tube 3 which will permit tube 55 to fire or conduct a current and it is only when the tube 55 is conducting that the indicator 68 is actuated. Therefore, if the electronic apparatus shown in Fig. 3 is used to indicate the size of a piece, it is only of the proper size as long as tube 55 is firing. The tolerance range within which the piece is good depends upon the length of time the tube 55 will fire which, in turn, depends upon the amount of shadow cast on tube 3 by the image of the piece undergoing inspection. The tolerance range can be widened or narrowed by changing the settings of the adjustable connection 62 on the resistor 63 and the adjustable connection 59 on the resistor 60. Furthermore, by this adjustment, the minimum tolerance, as well as the overall tolerance can be individually controlled.

Referring to Fig. 4, amplifying tube 8 and power tube 1 are connected in the same manner as the corresponding tubes of Fig. 1. The control of tube 1 by tube 8 is similar. The cathode of tube 1 is connected to the adjustable resistor 71 at point 72. The control grid 18 of tube 1 is connected through limiting resistor 21 in the line 23 to the point 20. With the phototube 3 completely in shadow, the bias on the tube 8 is adjusted such that no current flows through the amplifying tube 8. As the tube 3 receives more light, current flows through the anode circuit of tube 8 and the load resistor 17 and when the amount of current reaches the point at which the control grid 18 of tube 1 has its potential driven sufficiently in a negative direction, it will stop the flow of current or greatly reduce the flow of current through power tube 1 and the point at which the current will cease to flow through tube 1 is controlled by adjusting the adjustable resistor 71 so as to vary the negative potential placed on the cathode of power tube 1.

This circuit has an additional amplifying tube 47 connected in a similar manner to the amplifying tube 47 of Figure 3 with two exceptions, (1) the control grid 48 is connected to ground 76, and (2) the cathode is connected at point 73 to the adjustable resistor 53 which is directly connected to point 19 of the light sensitive circuit between resistor 7 and the light sensitive device 3. This hookup for the amplifying tube 47 is commonly referred to as being connected in cut-off position. The bias on the tube 47, when there is no light on phototube 3, is such that a substantial current flows through the plate circuit of tube 47 but as tube 3 receives more light, a greater positive potential is placed on the cathode circuit of tube 47 and since its control grid 48 is connected to ground, the bias eventually reaches the point where the positive potential on the cathode is such that the tube will cease to conduct current.

Although not shown on the drawing, the point 77 may be connected to an adjustable resistor in the line between the phototube 3 and the resistor 7, rather than connecting point 77 directly to point 19 and thus can be controlled the amplification of tube 47. The power tube 2 is connected to the amplifying tube 47 in a manner similar to that of the amplifying tube 2 in Fig. 1. In other words, as the plate current in amplifying tube 47 increases, it drives the bias on the tube 2 in a negative direction and thereby reduces the current flow through tube 2 and eventually tube 2 will cease to fire. Again, the conditions under which the tube 2 fires or ceases to fire, depending on the amount of light tube 3 receives, may be adjusted by moving the adjustable point 74 along the resistor 75.

The relay switches 35 and 36, controlled by the relay coils 33 and 34, respectively, said relay coils being located in the plate circuits of the tubes, respectively, are shown in such positions that the indicator 68 is not actuated when the tube 2 is firing and the tube 1 is not firing.

When tube 3 is receiving the maximum amount of light, a large amount of current is flowing through the plate circuit of amplifying tube 8 which places a sufficiently negative bias on grid 18 of tube 1 that it will not fire. Under the same conditions, a high positive potential is placed on the cathode of tube 47 and the tube 47 is therefore not firing and the tube 2 is firing since under these conditions the control grid 19 of tube 2 is substantially of the potential of the point 49 and the cathode of tube 2 is at a lower negative potential since it is connected at point 74. As tube 3 receives less light, it will reach the point where the negative bias on the control grid 18 of tube 1 is reduced to the point that the tube 1 will fire and the relay switch 35 will be actuated, completing the circuit for the indicator and the indicator will indicate that both of the tubes are firing. As tube 3 receives less light, it will pass through a period when tubes 1 and 2 both are firing but will reach a point when sufficient positive potential is placed on tube 47 that the plate current through the tube 47 will be increased to the point which will place a sufficiently high negative bias on the control grid 19 of tube 2 that tube 2 will cease firing which will open the relay switch 36 and the indicator 68 will no longer be actuated. Thus, within the broad principles of my invention, the indicator is only actuated for predetermined condition of illumination on tube 3, when tube 3 goes from maximum light to minimum light, and by properly controlling, regulating, and adjusting the bias on the grids 18 and 19 of tubes 1 and 2, respectively, tubes 1 and 2 are independently and successively controlled by the amount of light received from a light sensitive circuit such as that including phototube 3. In such application, I can place an article to be checked for a certain dimension in a photoelectric inspection zone wherein a beam of light is passed over the article and an image cast upon tube 3. If the article is of the right size within the predetermined tolerance range, which may be adjusted by controlling the time interval that both tubes 1 and 2 are firing, the indicator 68 will be actuated. If the article is too large, tube 3 will not receive sufficient light for the indicator 68 to be actuated because tube 2 will cease to fire when the amplifier tube 47 conducts sufficient current to drive the bias on tube 2 in a negative direction. Likewise, if the piece is too small, the tube 3 will receive too much light and sufficient current will flow through the plate circuit of tube 8 as to place a high negative bias on the control grid 19 of tube 1 and tube 1 will not fire. Thus, the tolerance range within which the piece is of proper dimension can be controlled by adjusting the times of firing of tubes 1 and 2.

Referring to Fig. 5, a method and device is shown wherein the principles shown in Fig. 4 may be used when employing only one power tube. In this case, the control grid 18, instead of being located in a separate power tube 1, is placed in power tube 2. In other words, the screen grid of power tube 2, instead of being connected to the cathode, is connected to the line 23. Otherwise, the function is the same as in Fig. 4. The bias on both grids 18 and 19 must be sufficiently positive for the indicator to be actuated. If either one of them is driven too far in a negative direction, the indicator will not be actuated. Thus, in checking the dimension of the piece, the piece is only good as long as it controls the amount of light on tube 3 such that the bias on tubes 18 and 19 is sufficiently positive relative to that of the cathode so that the tube 2 will fire.

Referring to Fig. 6, another modification employing the broad principles of my invention is shown. Phototubes 3, 79, and 80 are connected in parallel between the positive terminal 4 and the ground 6. The control grid 9 of the tube 8 is connected to a point between resistor 7 and the tubes 3, 79, and 80. Loading resistor 17 provides for the placing of a negative bias on the control grids 18, 19 and 87 of the phototubes 1, 2, and 78, respectively, to which are connected indicators 81, 82, and 83, respectively.

Amplifying tube 8 has its operating voltages provided by dividing resistors 13, 14, and 15, connected to ground 16. In a manner similar to that described for Fig. 1, the firing conditions of the tubes 1, 2, and 78 are controlled by the resistors 24, 26, and 26', connected to ground 25 for the tube 1, resistors 29, 27, and 29' connected to ground 28 for the tube 2, and the resistors 86, 85, and 84 connected to ground 28' for tube 78. The bias on the tubes 1, 2, and 78 are respectively adjusted and regulated through the adjustable resistors 24, 27, and 84. The limiting resistors 21, 22, and 88' are provided. This circuit is particularly adapted for indicating sizes of articles fed to the photoelectric inspection zone which vary in size. For example, if the article is of the smallest size, it will darken phototube 3 and by proper regulating of the negative potential of the cathode of the tube 78 by means of the adjustable resistor 84, tube 78 will fire, actuating indicator 83. If the tube is of the next larger size, each of phototubes 3 and 79 will be darkened and in that case, indicator 82 will be actuated in a similar manner. If the article is of the next size, phototube 80 will be darkened and indicator 81 will be actuated. Thus, I have provided a novel system for inspecting articles varying in size. In general, the principle shown in Fig. 6 is the same as that shown in Fig. 1 and the independent control of the firing condition of the tubes 1, 2, and 78 is accomplished in the same manner.

In Fig. 7 is shown an optical system which may be used in connection with any of the electronic devices heretofore described. In addition, there is shown a means for accepting or rejecting an article if the article does not meet the proper requirements.

Referring to Fig. 7, a light source 92 is provided and a condensing lens system 91 is located on the optical axis of the light source for projecting a beam of light through the inspection zone across the top of the article 95 being inspected. In this case, it is desired to check the article for proper size. The projecting lens 94 projects an image of the object onto magnifying mirror 93, which may be of any suitable type but is shown as convex, and the reflected magnified image cuts across the phototube 3 as shown. In this case, if the piece is exactly the right size, the tube 3 is receiving the proper amount of light because tube 2 is conducting and tube 1 is nonconducting and the accept circuit 38 shown in Fig. 2 is closed. The accept circuit may control the solenoid valve 88 and a blast of air will send the article 95 to the accept receptacle. If the piece is either too large or too small, the phototube 3 will not receive the proper amount of light and the reject circuit 37 shown in Fig. 2 will be closed which will actuate the valve 89 and a blast of air controlled by the solenoid valve 89 will flow through the line into the V block 90 and the article will be rejected by sending it to the reject receptacle. Thus, I have illustrated one way of sorting articles according to proper or improper size. A similar device can be used with the apparatus shown in Fig. 6 for sorting articles according to size.

Figs. 8 to 12 show diagrammatically various types of inspections that may be made using one or more of the modifications of the electronic circuit herein described. Fig. 8 shows a method for simultaneously indicating the positions of two edges of an article. In this case, the phototubes are connected in parallel and the control is made by the amount of light received by both of the phototubes shown. Phototubes 96 and 97 in Figure 8 are used to make the above inspection of the article 98. Fig. 9 shows an article to be inspected oriented in a proper manner for simultaneously indicating both the length and the dimension of an article. With specific reference to Figure 9, an article 100 is positioned in the V-block 101 against the stop 102 and the phototubes 103 and 104 are used for simultaneously indicating both the length and the dimension of the article 100.

Fig. 10 shows the location of a phototube employed to scan an article such as a cylinder wherein the cylinder is rotated in the inspection zone, for example, between the rollers as shown. If the piece is good, the phototubes will receive the proper amount of light during the entire rotation and this can be indicated by any one of the electronic circuits herein described. With specific reference to Figure 10 a cylindrical article 105 is rotated between the roller 106 and the phototube 107 as used for making the photoelectric inspection.

Likewise, Fig. 11 shows the location of a pair of phototubes in an apparatus wherein a round such as a cylinder may be rotated as in Fig. 10 and the eccentricity and concentricity of the inner and outer surfaces as well as the inner and outer dimensions may be determined. With specific reference to Figure 11 a cylindrical object 108 is rotated in a manner similar to that shown for Figure 10 and the phototubes 109 and 110 are used for indicating photoelectrically the eccentricity and concentricity for the inner and outer surface as well as the inner and outer dimensions.

Fig. 12 shows how a number of the tubes may be located around the perimeter of the image of the inside diameter such as is shown in Fig. 11 and where the cylinder 111 remains stationary and is not rotated. By connecting phototubes 112 in parallel such as those shown in Fig. 6 and by using the wiring diagram of Fig. 5, for example, there would only be one set of conditions wherein all the phototubes shown in Fig. 12 receive the proper amount of light to actuate indicator 68 of Fig. 5.

Throughout the above description, the amplifying tubes may be of any suitable type, although I have shown them as being the pentode type which I prefer to use in my invention. The power tubes may also be of any conventional type but I prefer to use the gas-filled arc discharge type as shown on the drawings. The indicators are only shown conventionally but the indicators may be meters, bells, lights, flags, etc., or may be a selecting device or may operate selecting devices wherein the article is routed or classified according to the type of inspection being made on the article.

I claim as my invention:

1. A photoelectric device for inspecting articles, for indicating the acceptance of said articles if they conform with the standard article within a predetermined tolerance range and for indicating the rejection of said articles if they fall outside said predetermined tolerance range, comprising a light source, means for projecting a beam of light through an inspection zone, a first source of potential, a light sensitive circuit including a photoelectric device, said photoelectric device positioned to receive light passing through the inspection zone and further positioned so as to be placed in a predetermined state of illumination when an article is in the inspection zone corresponding to the standard article within said tolerance range, a first amplifying means connected to said light sensitive circuit such that the current flowing through said first amplifying means is controlled by the amount of light received by said photoelectric device in said light senistive circuit, said first amplifying means comprising an amplifying tube having a loaded anode circuit, a control grid and a cathode circuit, said first amplifying means connected to a second source of potential, said control grid biased by said light sensitive circuit such that the more light received by the photoelectric device the more the voltage on said control grid is driven in a positive direction, a second amplifying means comprising a second and third amplifying tube connected in parallel, each of said last mentioned tubes is connected 180° out of phase with the first amplifying tube, each of said last mentioned tubes having an anode circuit, a control grid and a cathode circuit, each control grid of said second and third amplifying tubes being connected to the loaded anode circuit of the first amplifying tube such that the more current flowing through said anode circuit the more each control grid is driven in a negative direction of potential, each of said second and third amplifying tubes being normally biased by having their respective cathode circuits connected to a relatively negative source of potential in respect to their control grids so that each of said last mentioned tubes is rendered conducting, said third amplifying tube having its cathode circuit connected to a more negative source of potential than the cathode circuit of the second amplifying tube such that more current is required to flow through the anode circuit of the first amplifying tube for driving the control grid of the third amplifying tube in a negative direction of potential, thereby rendering said third amplifying tube non-conducting, than is required for driving the control grid of the second amplifying tube in a negative direction of potential, thereby rendering the second amplifying tube non-conducting, whereby the respective control grids of the second and third amplifying tubes have their respective voltage potentials successively changed in a negative direction by said photoelectric device receiving an increasing amount of light and whereby said control grids have their respective voltage potentials changed in a positive direction successively but in reverse order from said first mentioned change by said photoelectric device receiving a decreasing amount of light and an indicating means operably connected with the anode circuits of the second and third amplifying tubes in the second amplifying means for indicating the acceptance of an article within a predetermined tolerance range only when each of the control grids in the second and third amplifying tubes are sufficiently positive to cause current to flow through each of the second and third amplifying tubes and such positive potential is placed on the control grids in said second and third tubes only when said photoelectric device receives said predetermined condition of illumination when an article is in the inspection zone corresponding to a standard article within said predetermined tolerance range and said indicating means indicating the rejection of said article when either of said control grids is driven in a negative direction of potential, thereby substantially reducing the flow of current through the tube in which said control grid has its potential thus driven in a negative direction as caused by a different condition of illumination on said photoelectric device when an article is in the inspection zone which does not conform to the standard article within said tolerance range.

2. A photoelectric device for inspecting articles, for indicating the acceptance of said articles if they conform with the standard article within a predetermined tolerance range and for indicating the rejection of said articles if they fall outside said predetermined tolerance range, comprising a light source, means for projecting a beam of light through an inspection zone, a first source of potential, a light sensitive circuit including a photoelectric device, said photoelectric device positioned to receive light passing through the inspection zone and further positioned so as to be placed in a predetermined state of illumination when an article is in the inspection zone corresponding to the standard article within said tolerance range, a first amplifying means connected to said light sensitive circuit such that the current flowing through said first amplifying means is controlled by the amount of light received by said photoelectric device in said light sensitive circuit, said first amplifying means comprising a first amplifying tube and a second amplifying tube, each of said amplifying tubes having an anode circuit, a control grid and a cathode circuit, each of said amplifying tubes being biased by the light sensitive circuit such that the more light received by said photoelectric device, the more positive is the potential placed on each of said control grids, the cathode circuit of the first amplifying tube having a load resistor connected therein, the anode circuit of the second amplifying tube having a load resistor connected therein, a second amplifying means comprising a third amplifying tube having an anode circuit, a cathode circuit and two control grids, said control grids jointly controlling the flow of current through said third amplifying tube, one of said latter control grids biased by being connected to the loaded cathode circuit of the first amplifying tube such that the more current that flows through the first amplifying tube, the greater the potential on the said last mentioned grid is driven in a positive direction, the other of said control grids in said third amplifying tube biased by being connected to the loaded anode circuit of the second amplifying tube such that the more current that flows through the second amplifying tube the more negative is driven the potential on said other control grid, whereby the first mentioned control grid in the third amplifying tube is driven in a positive direction for an increasing amount of light received by the photoelectric device and is driven in a negative direction of potential for a decreasing amount of light as received by the photoelectric device and the second mentioned control grid in the third amplifying tube is driven in a negative direction of potential for an increasing amount of light as received by the photoelectric device and in a positive direction for decreasing amount of light as received by the photoelectric device and an indicating means operably connected to said second amplifying means for indicating the acceptance of an article within a predetermined tolerance range only when a predetermined amount of current flows through said second amplifying means, said predetermined amount of current flowing through said second amplifying means corresponding to said predetermined condition of illumination of said photoelectric device when an article is in the inspection zone corresponding to a standard article within said predetermined tolerance range and said indicating means indicating the rejection of said article for any other amount of current flowing through said second amplifying means corresponding to a different condition of illumination on said photoelectric device when an article is in the inspection zone which does not conform to the standard article within said tolerance range.

3. A photoelectric device for inspecting articles, for indicating the acceptance of said articles if they conform with the standard article within a predetermined tolerance range and for indicating the rejection of said articles if they fall outside said predetermined tolerance range, comprising a light source, means for projecting a beam of light through an inspection zone, a first source of potential, a light sensitive circuit including a photoelectric device, said photoelectric device positioned to receive light passing through the inspection zone and further positioned so as to be placed in a predetermined state of illumination when an article is in the inspection zone corresponding to the standard article within said tolerance range, a first amplifying means connected to said light sensitive circuit such that the current flowing through said first amplifying means is controlled by the amount of light received by said photoelectric device in said light sensitive circuit, said first amplifying means comprising a first amplifying tube and a second amplifying tube, said first amplifying tube having a loaded anode circuit, a control grid and a cathode circuit, said control grid being biased by the light sensitive circuit such that the more light received by the photoelectric device, the more said control grid is driven in a positive direction of potential, said second amplifying tube having a loaded anode circuit, a control grid and a loaded cathode circuit, said control grid being connected to ground, said cathode circuit of said second amplifying tube being connected to said light sensitive circuit such that the more light received by said photoelectric device the more said last mentioned cathode is driven in a positive direction of potential in respect to its control grid, thereby decreasing the flow of current through said second amplifying tube, a second amplifying means comprising a third amplifying tube and a fourth amplifying tube, said third amplifying tube having an anode circuit, a control grid and a cathode circuit, said third amplifying tube being connected 180° out of phase with the first amplifying tube such that the more current that flows through the first amplifying tube the less current will flow through the third amplifying tube, said fourth amplifying tube having an anode circuit, a control grid and a cathode circuit, and said fourth tube being connected 180° out of phase with said first amplifying tube such that the more current flowing through the second amplifying tube the less current will flow through the fourth amplifying tube and said control grids in the third and fourth amplifying tubes being further biased and further controlled such that when the photoelectric device receives an increasing amount of light, varying from a relatively small amount of light to a relatively large amount of light that the control grid in the third amplifying tube is driven in a negative direction of potential and the control grid in the fourth amplifying tube is driven in a positive direction of potential and such that when the photoelectric device receives a decreasing amount of light, varying from a relatively large amount of light to a relatively small amount of light that the control grid in the fourth amplifying tube is driven in a positive direction of potential and the control grid in the third amplifying tube is driven in a negative direction of potential, and an indicating means operably connected to the second amplifying means for indicating the acceptance of an article within a predetermined tolerance range only when the control grid in the third amplifying tube is driven in a postive direction of potential and the control grid in the fourth amplifying tube is driven in a negative direction of potential as caused by said predetermined condition of illumination of said photoelectric device when an article is in the inspection zone corresponding to a standard article within said predetermined tolerance range and said indicating means indicating the rejection of said article for any other potential placed on the last mentioned control grids as above set forth as caused by a different condition of illumination of said photoelectric device when an article is in the inspection zone which does not conform to the standard article within said tolerance range.

4. An apparatus for inspecting articles, comprising an indicating means; means defining an inspection zone; means for projecting a beam of light through said inspection zone; a photoelectric device arranged with respect to said inspection zone in said light beam to be placed in a predetermined condition of illumination when a standard article is in the inspection zone; an electronic circuit comprising a light sensitive circuit including said photoelectric device, a first amplifying means connected to said light sensitive circuit such that changes in the amount of light received by the photoelectric device cause corresponding changes in the amount of current flowing through the first amplifying means whereby said change in current is caused only by the amount of light received by said photoelectric device in said light sensitive circuit, a second amplifying means comprising a first control grid and a second control grid, said control grids operatively connected to the first amplifying means such that said control grids have their respective voltages changed only by said changes in the amount of current flowing through the first amplifying means and only in accordance with changes in the amount of light received by said photoelectric device, and said control grids being further biased and further controlled such that they are successively acted upon and each have their respective voltages changed when said photoelectric device receives an increasing amount of light varying from a relatively small amount of light to a relatively large amount of light, and such that each grid is acted upon successively and in reverse order from the first mentioned change in voltage whereby their respective voltages are changed in the opposite direction of potential from said first mentioned change when the photoelectric device receives a decreasing amount of light varying from a relatively large amount of light to a relatively small amount of light; means in said electronic circuit under the control of both the first and second control grids in said second amplifying means for controlling said indicating means for indicating the acceptance of said article when said phototube receives an amount of light corresponding to said predetermined condition of illumination when a standard article is in the inspection zone and for indicating the rejection of the article when said photoelectric device receives any other condition of illumination due to the presence of an article in the inspection zone which does not conform to the standard article.

WERNER A. GIESEKE.

REFERENCES CITED

The following references are of record in the file of this patent:

UNITED STATES PATENTS

| Number | Name | Date |
|---|---|---|
| 1,722,751 | Jones | July 30, 1929 |
| 2,085,671 | Powers | June 29, 1937 |
| 2,102,664 | Alexander | Dec. 21, 1937 |
| 2,140,355 | Gulliksen | Dec. 13, 1938 |
| 2,177,133 | Desch | Oct. 24, 1939 |